(12) United States Patent
Rephlo

(10) Patent No.: US 10,915,882 B2
(45) Date of Patent: Feb. 9, 2021

(54) SYSTEM AND METHOD FOR TRIGGERING MOBILE DEVICE FUNCTIONALITY USING A PAYMENT CARD

(71) Applicant: Capital One Services, LLC, McLean, VA (US)

(72) Inventor: Jeremy Rephlo, Washington, VA (US)

(73) Assignee: Capital One Services, LLC, McLean, VA (US)

( * ) Notice: Subject to any disclaimer, the term of this patent is extended or adjusted under 35 U.S.C. 154(b) by 242 days.

(21) Appl. No.: 14/133,762

(22) Filed: Dec. 19, 2013

(65) Prior Publication Data

US 2014/0172577 A1 Jun. 19, 2014

Related U.S. Application Data

(60) Provisional application No. 61/739,076, filed on Dec. 19, 2012.

(51) Int. Cl.
  *G06Q 20/32* (2012.01)
  *G06Q 20/40* (2012.01)
(52) U.S. Cl.
  CPC ......... *G06Q 20/322* (2013.01); *G06Q 20/40* (2013.01)
(58) Field of Classification Search
  CPC .................. G06Q 20/322; G06Q 20/40

USPC ....................................... 705/14.64
See application file for complete search history.

(56) References Cited

U.S. PATENT DOCUMENTS

| | | | | |
|---|---|---|---|---|
| 8,010,403 B2 * | 8/2011 | Kala | ............... | G06Q 30/02 705/7.33 |
| 8,788,881 B2 * | 7/2014 | Salomon | ............ | H04W 4/00 714/18 |
| 2004/0107170 A1 * | 6/2004 | Labrou | ............ | G06Q 20/02 705/64 |
| 2012/0109749 A1 * | 5/2012 | Subramanian | ..... | G06Q 30/0255 705/14.53 |
| 2012/0123841 A1 * | 5/2012 | Taveau | ............ | G06Q 20/10 705/14.23 |
| 2012/0158589 A1 * | 6/2012 | Katzin | ............ | G06Q 20/12 705/44 |
| 2012/0310831 A1 * | 12/2012 | Harris | ............ | G06Q 30/02 705/44 |

* cited by examiner

*Primary Examiner* — Azam A Ansari
(74) *Attorney, Agent, or Firm* — Troutman Pepper Hamilton Sanders LLP; Christopher Forstner; John Morrissett

(57) ABSTRACT

A system and method in accordance with example embodiments may include providing functionality triggers to a consumer's mobile device in response to using a payment card in order to make a purchase. Functionality triggers may include account functionality, rewards functionality, social networking functionality, and offer or advertisement functionality to be performed on a consumer's mobile device.

17 Claims, 6 Drawing Sheets

US 10,915,882 B2

SYSTEM AND METHOD FOR TRIGGERING MOBILE DEVICE FUNCTIONALITY USING A PAYMENT CARD

CROSS-REFERENCE TO RELATED APPLICATIONS

This application claims priority to U.S. Provisional Patent Application No. 61/739,076, filed on Dec. 19, 2012, the entire contents of which is incorporated herein by reference.

FIELD OF THE DISCLOSURE

The present disclosure relates to systems and methods for triggering mobile device functionality when a consumer makes a payment by, for example, using a payment card or other payment device.

BACKGROUND OF THE DISCLOSURE

Consumers are given various options when it comes to methods of payment. In a cashless system, a consumer may use a variety of payment cards, such as credit cards, debit cards, gift cards, loyalty cards, identification cards, and any other object utilizing a magnetic stripe for payment. Alternatively, a variety of "tap and pay" cards or smart cards are available for payment whereby an embedded chip and antenna combination are used to transmit payment details simply by placing the payment card on or near a reader.

Mobile devices, such as smart phones, allow for a user to use a "tap and pay" method of payment or alternatively present a barcode to scan so that all of the information stored in a traditional payment card may be stored within one mobile device.

However, while consumers and merchants are transitioning from a traditional payment card method to a mobile device payment method, there is a lack of use of functionality associated with account providers or payment cards in mobile devices. These and other drawbacks exist.

BRIEF DESCRIPTION OF THE DRAWINGS

Various embodiments of the present disclosure, together with further objects and advantages, may best be understood by reference to the following description taken in conjunction with the accompanying drawings, in the several Figures of which like reference numerals identify like elements, and in which.

DETAILED DESCRIPTION OF THE EMBODIMENTS

Figure 1:
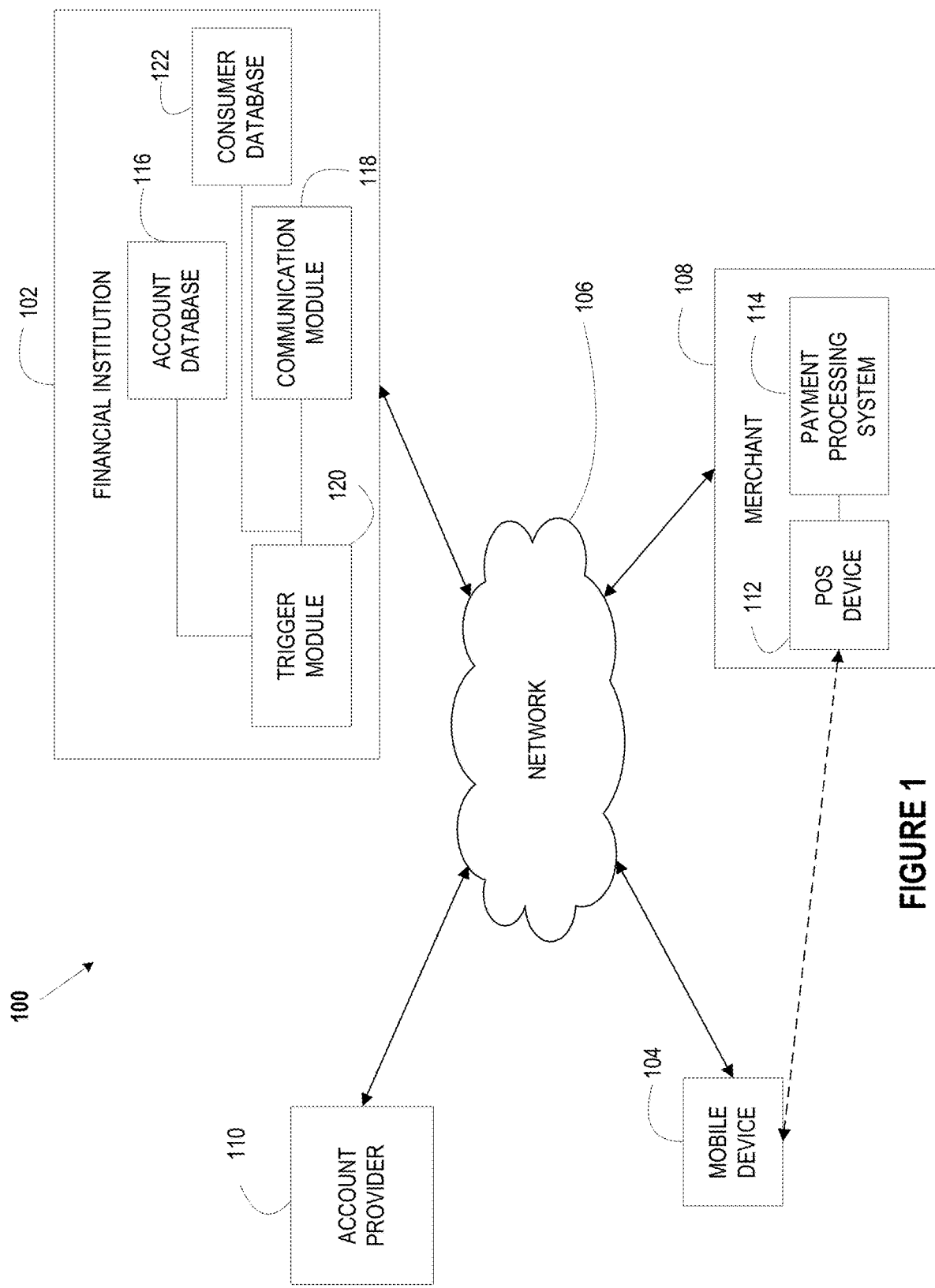
FIG. 1 depicts an example embodiment of a system implementing mobile device triggers using a payment card according to the disclosure.

The following description is intended to convey a thorough understanding of the embodiments described by providing a number of specific example embodiments and details involving systems and methods for triggering mobile device functionality during the use of and/or approximately around the time of use of a payment card. It should be appreciated, however, that the present disclosure is not limited to these specific embodiments and details, which are exemplary only. It is further understood that one possessing ordinary skill in the art, in light of known systems and methods, would appreciate the use of the invention for its intended purposes and benefits in various embodiments, depending on specific design and other needs. A financial institution and system supporting a financial institution are used as examples for the disclosure. The disclosure is not intended to be limited to financial institutions only.

According to the various embodiments of the present disclosure, systems and methods enable the triggering of mobile device functionality during the use of and/or approximately around the time of use of a payment card. Financial institutions may be privy to a large amount of customer data. For example, a financial institution may possess information regarding a customer's name, address, social security number, income information, transaction information, demographic information, or any other information. From this information, a financial institution may derive many other factors, including for example but not by way of limitation, the potential value of a customer to an advertiser or merchant, a demographic segment of a customer, etc. The financial institution also may have the ability to measure the impact of advertisements and offers delivered to customers.

By example and not by way of limitation, the institution may utilize one or more databases to store pooled customer data. Additionally, one or more advertisers and/or merchants may receive access to the data pool for informational or analysis purposes. Furthermore, the one or more advertisers and/or merchants may provide data relating to analysis of the accounts, such as, targeted advertisements or offers (i.e., advertisements and offers that are to be directed to consumers who match certain criteria).

In an example embodiment, when a consumer uses a payment card, the financial institution linked to that payment card may receive notification that the payment card is being used. For example, the financial institution may be notified during the authorization of the transaction. The financial institution also may interpret the received authorization request as a notification that the payment card is being used. The institution may then provide targeted advertisements and/or offers to the consumer on a mobile device in response to the payment card being used.

In an example embodiment, when a consumer uses a payment card, the financial institution linked to that payment card may receive notification that the payment card is being used. For example, the financial institution may be notified during the authorization of the transaction. The financial institution also may interpret the received authorization request as a notification that the payment card is being used. The institution may then provide payment-related data, such as a receipt, discounts used, and rewards earned, which may be pushed to a consumer's mobile device.

In an example embodiment, when a consumer uses a payment card, the financial institution linked to that payment card may receive notification that the payment card is being used. This notification may be received from, for example, an authorization network. For example, the financial institution also may interpret the received authorization request as a notification that the payment card is being used. The institution may then provide account-related data, such as account balance, total account rewards, account summary, a breakdown of spending by category for the account, and the like.

In an example embodiment, when a consumer uses a payment card, the financial institution linked to that payment card may receive notification that the payment card is being used. For example, the financial institution may be notified during the authorization of the transaction. The financial institution also may interpret the received authorization request as a notification that the payment card is being used. The institution may then trigger social networking activity on a mobile device, such as provide a trigger to "like" a product and/or merchant, to "check in" to a merchant location, and/or provide a trigger for the consumer to share any information about the purchase.

In addition, the merchant where the payment card is being used may provide targeted advertisements, offers, discounts, promotions, and/or "fun facts" to the mobile device in response to a purchase at the merchant location. The financial institution linked to the payment card also may provide merchant-specific advertisements, offers, discounts, promotions, and/or "fun facts" in response to an authorization request at the merchant location. By way of example, "fun facts" may include merchant rewards or loyalty status earned, number of times a consumer has visited a merchant or a merchant location, upcoming merchant events or promotions, prior purchase comparisons (e.g., "You spent $12 more at your last visit," "View prior visit purchases"), other consumer purchase comparisons (e.g., "Consumers who purchased X, also purchased Y!"), and any other fun fact particular to the merchant and/or consumer.

The example use of "mobile device" throughout the application is only by way of example, and the functionality triggered may also be triggered on a personal computer, television, gaming system, tablet, or any other device capable of making a connection with a consumer as described below. The exemplary use of "advertisement" and/or "offer" throughout the application is only by way of example, and the information pushed to the consumer may include not only advertisements and/or offers, but also discounts, promotions, and/or "fun facts" that may be relevant to the consumer, financial institution and/or merchant.

Because a financial institution may have access to multiple accounts of a consumer, both account held with that financial institution and account held with another account provider, a financial institution may receive notification that any account association with a consumer is being used for payment. As a result, a financial institution may push any of the above-discussed notifications regardless of whether the account being used is an account held with the financial institution or not.

In addition to triggering functionality on a consumer's mobile device, in an example embodiment, responses to the triggered functionality may be collected order to determine, for example, a success rate associated with a particular advertisement and/or offer and/or to determine preferences of a consumer. By way of example, where account or transaction-related data are pushed to the mobile device of the consumer and the consumer is altered to the pushed data via, for example, a push notification, responses may be gathered to determine which push notifications are most desired by a consumer based on if the user interacts with the mobile device upon receiving the push notification or not.

The financial institution may implement security protocols and safeguards to protect user information. For example, information which would permit a customer to be identified may be anonymized to protect a customer's privacy. Also, the financial institution my implement encryption, authentication, firewalls, and any other available security protocol.

FIG. 1 depicts an example system 100 for providing mobile device functionality triggers in response to the use of a payment card. System 100 may include a financial institution 102, an account provider 110, a mobile device 104, and a merchant 108 connected over a network 106. Although not shown in FIG. 1, system 100 may also include one or more authorization networks coupled to network 106 to provide notifications to financial institution 102, for example.

Figure 2:
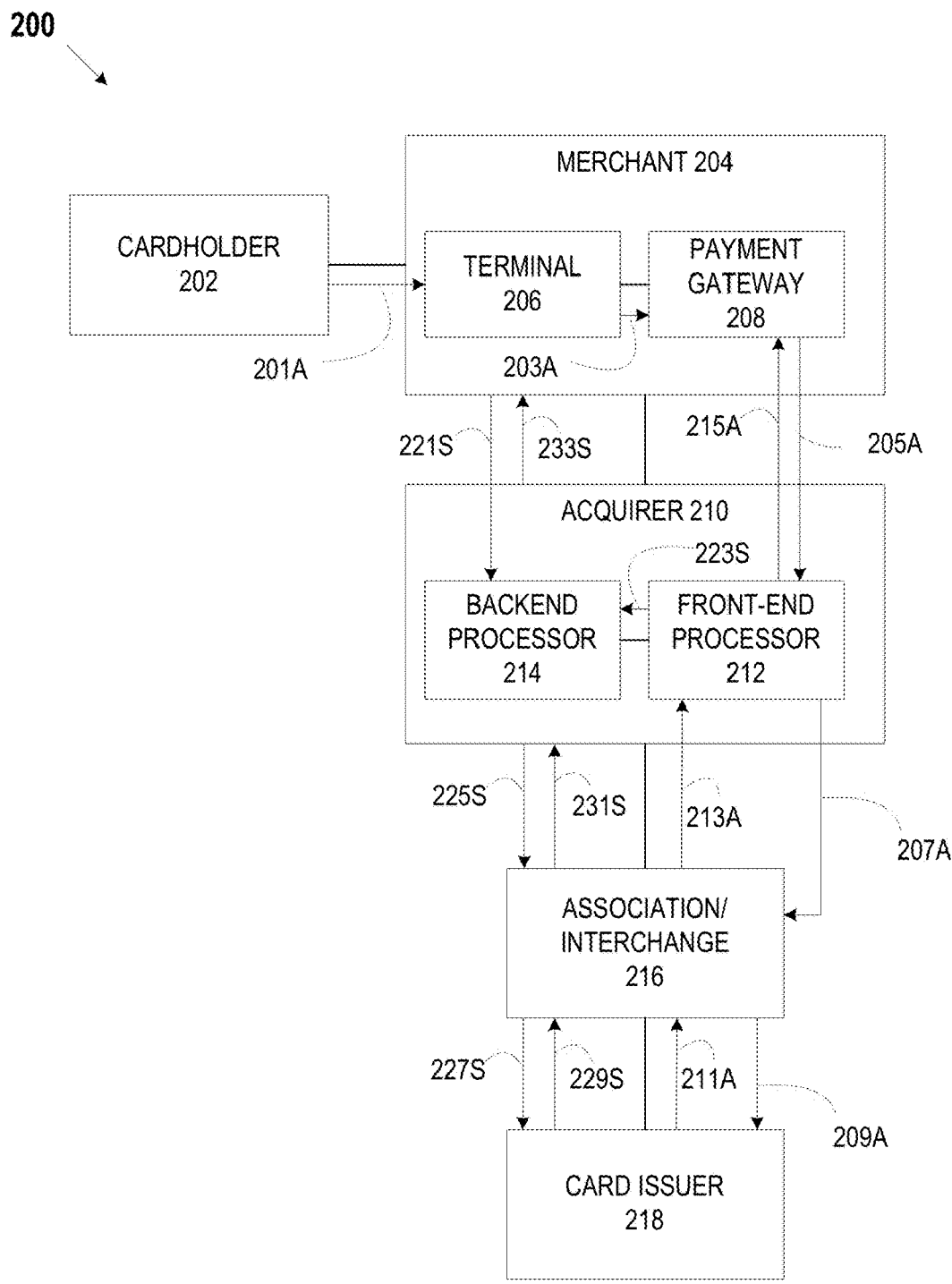
FIG. 2 depicts an example embodiment of a system and method for authorizing a transaction according to the disclosure.

FIG. 2 illustrates an example system 200 and method for card authorization. As shown and described in FIG. 2, merchants, cardholders and financial institutions may be connected with a card association network to enable secure transactions and timely payments. System 200 may include a cardholder 202, merchant 204, Acquirer 210, Association/Interchange 216, and card issuer 218.

Cardholder 202 may be any card holder, including a credit card holder, debit card holder, stored value card holder and the like. Cardholder 202 may possess a plastic card or carry a device (e.g., a mobile device) that securely stores card credentials and is capable of transmitting the card credentials to, for example, a PoS terminal (e.g., terminal 206). Cardholder 202 may interact with a merchant (e.g., merchant 204) by presenting a card or card credentials to a terminal (e.g., terminal 206).

Merchant 204 may be any merchant that accepts payment from a cardholder, for example. Merchant 204 may be any retailer, service provider, business entity, or individual that accepts payments. Merchant 204 may include software, firmware and hardware for accepting and/or processing payments. For example, as illustrated in FIG. 2, merchant 204 may include a terminal 206 and a payment gateway 208. Terminal 206 and payment gateway 208 may comprise the physical or virtual device(s) used by merchant 204 to communicate information to front-end processor 212 of acquirer 210. Terminal 206 may be similar to PoS system 400 as shown and described in Figure Y. In various embodiments, payment gateway 208 may be an e-commerce application service provider service that authorizes payments for merchants. As such, payment gateway 208 may be a virtual equivalent of a PoS terminal and interface with, for example, a billing system of merchant 204 and pass data to front-end processor 212 of acquirer 210.

Acquirer 210 may be, for example, a financial institution or bank, that holds the contract for providing payment processing services to merchant 204. Merchant 204 may have a merchant account that may serve as a contract under which Acquirer 210 may extend a line of credit to a merchant who wishes to accept, for example, credit card transactions. As shown in FIG. 2, Acquirer 210 may be associated with front-end processor 212 and back-end processor 214.

In various examples, front-end processor 212 may be a platform that card terminal 206 and/or payment gateway 208 communicate with when approving a transaction. Front-end processor 212 may include hardware, firmware, and software to process transactions. Front-end processor 212 may be responsible for the authorization and capture portion of credit card transaction. Front-end processor 212 also may include additional front-end platform interconnections to support, for example, ACH and debit transactions.

Backend processor 214 may be a platform that takes captured transactions from front-end processor 212 and settles them through an Interchange system (e.g., association/interchange 216). Back-end processor 214 may generate, for example, daily ACH files for merchant settlement. Back-end processor 214 also may handle chargeback handling, retrieval request and monthly statements.

Association/interchange 216 may be the consumer payment system whose members are the financial institutions that issue payment cards and/or sign merchant to accept payment cards. Example associations/interchanges 216 may include, Visa®, MasterCard®, and AmericanExpress®. Association/interchange 216 may include one or more computer systems and networks to process transactions.

Issuer 218 may be a financial institution that issues payment cards and maintains a contract with cardholders for repayment. In various embodiments, issuer 218 may issue credit, debit, and/or stored value cards, for example. Example issuers may include, Capital One, Bank of America, Citibank, and the like.

In various embodiments, processing a payment card transaction may involves two stages: (1) authorization and (2) clearing and settlement. Authorization may refer to an electronic request that is sent through various parties to either approve or decline the transaction. Clearing and Settlement may refer to settlement of the parties' settle accounts to enable the parties to get paid.

During authorization, cardholder 202 may present payment card as payment (201A) at merchant 204 PoS terminal 206, for example. Merchant 204 may enter card into a physical PoS terminal 206 or submit a credit card transaction to a payment gateway 208 on behalf of cardholder 202 via secure connection from a Web site, retail location, or a wireless device.

Payment gateway 208 may receive the secure transaction information (203A) and may pass the secure transaction information (205A) via a secure connection to the merchant acquirer's 210 front-end processor 212.

Front-end processor 212 may submit the transaction (207A) to association/interchange 216 (e.g., a network of financial entities that communicate to manage the processing, clearing and settlement of credit card transactions). Association/interchange 216 may route the transaction (209A) to the customer's Issuer 218. Issuer 218 may approve or decline the transaction and passes the transaction results back (211A) through association/interchange 216. Association/interchange then may relay the transaction results (213A) to front-end processor 212.

Front-end processor 212 may relay the transaction results (215A) back to the payment gateway 208 and/or terminal 206. Payment gateway 208 may store the transaction results and sends them to merchant 204. Merchant 204 may receive the authorization response and complete the transaction accordingly.

During settlement, merchant 204 may deposit the transaction receipt (221S) with acquirer 210 via, for example, a settlement batch. Captured authorizations may be passed (223S) from front-end processor 212 to the back-end processor 214 for settlement. Back-end processor may generates ACH files for merchant settlement. Acquirer may submit settlement files (225S, 227S) to Issuer 218 for reimbursement via association/interchange 216. Issuer 218 may post the transaction and pay merchant 204 (229S, 231S, 233S).

Referring back to FIG. 1, network 106 may enable communication between a financial institution 102, a mobile device 104, a merchant 108 and an account provider 110. For example, Network 106 may be one or more of a wireless network, a wired network or any combination of wireless network and wired network. For example, network 106 may include one or more of a fiber optics network, a passive optical network, a cable network, an Internet network, a satellite network, a wireless LAN, a Global System for Mobile Communication ("GSM"), a Personal Communication Service ("PCS"), a Personal Area Network ("PAN"), Wireless Application Protocol (WAP), Multimedia Messaging Service (MMS), Enhanced Messaging Service (EMS), Short Message Service (SMS), Time Division Multiplexing (TDM) based systems, Code Division Multiple Access (CDMA) based systems, D-AMPS, Wi-Fi, Fixed Wireless Data, IEEE 802.11b, 802.15.1, 802.11n and 802.11g or any other wired or wireless network for transmitting and receiving a data signal.

In addition, network 106 may include, without limitation, telephone lines, fiber optics, IEEE Ethernet 902.3, a wide area network ("WAN"), a local area network ("LAN"), or a global network such as the Internet. Also network 106 may support an Internet network, a wireless communication network, a cellular network, or the like, or any combination thereof. Network 106 may further include one network, or any number of the exemplary types of networks mentioned above, operating as a stand-alone network or in cooperation with each other. Network 106 may utilize one or more protocols of one or more network elements to which they are communicatively coupled. Network 106 may translate to or from other protocols to one or more protocols of network devices. Although network 106 is depicted as a single network, it should be appreciated that according to one or more embodiments, network 106 may comprise a plurality of interconnected networks, such as, for example, the Internet, a service provider's network, a cable television network, corporate networks, and home networks.

Financial institution system 102 may include, for example, an account database 116, a communication module 118, a trigger module 120, and a consumer database 122. In various embodiments, the account database 116, communication module 118, trigger module 120, and consumer database 122 may be implemented in a financial institution system as shown and described below in, for example, FIG. 3. Account database 116 may maintain information relating to the accounts of consumers. As referred to herein, an account may include, for example, a prepaid card account, stored value card account, debit card account, check card account, payroll card account, gift card account, prepaid credit card account, charge card account, checking account, rewards account, line of credit account, or credit account, or any other account for financing a transaction in a commercial system 100. Account database 116 may also include an association of payment data with respective consumers. For example, account database 116 may include an association of a token "123456" with account number "1234 5678 9012 3456," which belongs to John Q. Cardholder. Account database 116 may also include specifications associated with an account such as account rewards, account terms, including rewards terms, interest rates, late fees, and the like, current account status, and fees associated with the account. As will be described in more detail below, account database 116 may be accessed for authorizing transactions and or payment requests.

Figure 3:
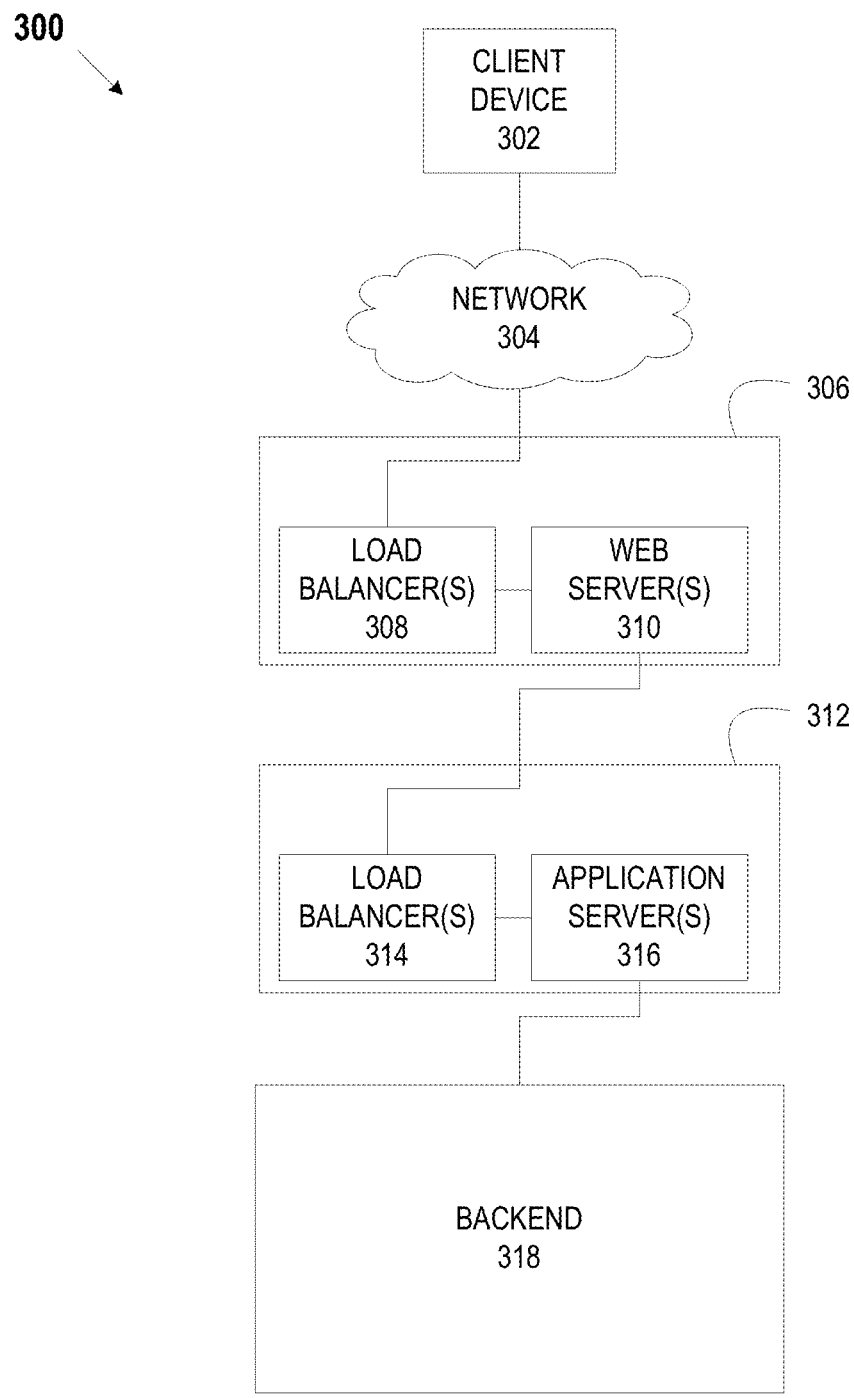
FIG. 3 depicts an example embodiment of a financial institution according to the disclosure.

FIG. 3 depicts an example system 300 that may enable a financial institution, for example, to provide network services to its customers. As shown in FIG. 3, system 300 may include a client device 302, a network 304, a front-end controlled domain 306, a back-end controlled domain 312, and a backend 318. Front-end controlled domain 306 may include one or more load balancers 308 and one or more web servers 310. Back-end controlled domain 312 may include one or more load balancers 314 and one or more application servers 316.

Client device 302 may be a network-enabled computer: As referred to herein, a network-enabled computer may include, but is not limited to: e.g., any computer device, or communications device including, e.g., a server, a network appliance, a personal computer (PC), a workstation, a mobile device, a phone, a handheld PC, a personal digital assistant (PDA), a thin client, a fat client, an Internet browser, or other device. The one or more network-enabled computers of the example system 300 may execute one or more software applications to enable, for example, network communications.

Client device 302 also may be a mobile device: For example, a mobile device may include an iPhone, iPod, iPad from Apple® or any other mobile device running Apple's iOS operating system, any device running Google's Android® operating system, including for example, Google's wearable device, Google Glass, any device running Microsoft's Windows® Mobile operating system, and/or any other smartphone or like wearable mobile device.

Network 304 may be one or more of a wireless network, a wired network, or any combination of a wireless network and a wired network. For example, network 304 may include one or more of a fiber optics network, a passive optical network, a cable network, an Internet network, a satellite network, a wireless LAN, a Global System for Mobile Communication (GSM), a Personal Communication Service (PCS), a Personal Area Networks, (PAN), D-AMPS, Wi-Fi, Fixed Wireless Data, IEEE 802.11b, 802.15.1, 802.11n, and 802.11g or any other wired or wireless network for transmitting and receiving a data signal.

In addition, network 304 may include, without limitation, telephone lines, fiber optics, IEEE Ethernet 902.3, a wide area network (WAN), a local area network (LAN) or a global network such as the Internet. Also, network 304 may support an Internet network, a wireless communication network, a cellular network, or the like, or any combination thereof. Network 110 may further include one network, or any number of example types of networks mentioned above, operating as a stand-alone network or in cooperation with each other. Network 110 may utilize one or more protocols of one or more network elements to which they are communicatively couples. Network 304 may translate to or from other protocols to one or more protocols of network devices. Although network 304 is depicted as a single network, it should be appreciated that according to one or more embodiments, network 304 may comprise a plurality of interconnected networks, such as, for example, the Internet, a service provider's network, a cable television network, corporate networks, and home networks.

Front-end controlled domain 306 may be implemented to provide security for backend 318. Load balancer(s) 308 may distribute workloads across multiple computing resources, such as, for example computers, a computer cluster, network links, central processing units or disk drives. In various embodiments, load balancer(s) 310 may distribute workloads across, for example, web server(S) 316 and/or backend 318 systems. Load balancing aims to optimize resource use, maximize throughput, minimize response time, and avoid overload of any one of the resources. Using multiple components with load balancing instead of a single component may increase reliability through redundancy. Load balancing is usually provided by dedicated software or hardware, such as a multilayer switch or a Domain Name System (DNS) server process.

Load balancer(s) 308 may include software that monitoring the port where external clients, such as, for example, client device 302, connect to access various services of a financial institution, for example. Load balancer(s) 308 may forward requests to one of the application servers 316 and/or backend 318 servers, which may then reply to load balancer 308. This may allow load balancer(s) 308 to reply to client device 302 without client device 302 ever knowing about the internal separation of functions. It also may prevent client devices from contacting backend servers directly, which may have security benefits by hiding the structure of the internal network and preventing attacks on backend 318 or unrelated services running on other ports, for example.

A variety of scheduling algorithms may be used by load balancer(s) 308 to determine which backend server to send a request to. Simple algorithms may include, for example, random choice or round robin. Load balancers 308 also may account for additional factors, such as a server's reported load, recent response times, up/down status (determined by a monitoring poll of some kind), number of active connections, geographic location, capabilities, or how much traffic it has recently been assigned.

Load balancers 308 may be implemented in hardware and/or software. Load balancer(s) 308 may implement numerous features, including, without limitation: asymmetric loading; Priority activation: SSL Offload and Acceleration; Distributed Denial of Service (DDoS) attack protection; HTTP compression; TCP offloading; TCP buffering; direct server return; health checking; HTTP caching; content filtering; HTTP security; priority queuing; rate shaping; content-aware switching; client authentication; programmatic traffic manipulation; firewall; intrusion prevention systems.

Web server(s) 310 may include hardware (e.g., one or more computers) and/or software (e.g., one or more applications) that deliver web content that can be accessed by, for example a client device (e.g., client device A 02) through a network (e.g., network 304), such as the Internet. In various examples, web servers, may deliver web pages, relating to, for example, online banking applications and the like, to clients (e.g., client device 302). Web server(s) 310 may use, for example, a hypertext transfer protocol (HTTP or sHTTP) to communicate with client device 302. The web pages delivered to client device may include, for example, HTML documents, which may include images, style sheets and scripts in addition to text content.

A user agent, such as, for example, a web browser, web crawler, or native mobile application, may initiate communication by making a request for a specific resource using HTTP and web server 310 may respond with the content of that resource or an error message if unable to do so. The resource may be, for example a file on stored on backend 318. Web server(s) 310 also may enable or facilitate receiving content from client device 302 so client device AO2 may be able to, for example, submit web forms, including uploading of files.

Web server(s) also may support server-side scripting using, for example, Active Server Pages (ASP), PHP, or other scripting languages. Accordingly, the behavior of web server(s) 310 can be scripted in separate files, while the actual server software remains unchanged.

Load balancers 314 may be similar to load balancers 308 as described above.

Application server(s) 316 may include hardware and/or software that is dedicated to the efficient execution of procedures (e.g., programs, routines, scripts) for supporting its applied applications. Application server(s) 316 may comprise one or more application server frameworks, including, for example, Java application servers (e.g., Java platform, Enterprise Edition (Java EE), the .NET framework from Microsoft®, PHP application servers, and the like). The various application server frameworks may contain a comprehensive service layer model. Also, application server(s) 316 may act as a set of components accessible to, for example, a financial institution or other entity implementing system 300, through an API defined by the platform itself. For Web applications, these components may be performed in, for example, the same running environment as web server(s) 310, and application servers 316 may support the construction of dynamic pages. Application server(s) 316 also may implement services, such as, for example, clustering, fail-over, and load-balancing. In various embodiments, where application server(s) 316 are Java application servers, the web server(s) 316 may behaves like an extended virtual machine for running applications, transparently handling connections to databases associated with backend 318 on one side, and, connections to the Web client (e.g., client device 302) on the other.

Backend 318 may include hardware and/or software that enables the backend services of, for example, a financial institution or other entity that maintains a distributes system similar to system 300. For example, backend 318 may include, a system of record, online banking applications, a rewards platform, a payments platform, a lending platform, including the various services associated with, for example, auto and home lending platforms, a statement processing platform, one or more platforms that provide mobile services, one or more platforms that provide online services, a card provisioning platform, a general ledger system, and the like. Backend 318 may be associated with various databases, including account databases that maintain, for example, customer account information, product databases that maintain information about products and services available to customers, content databases that store content associated with, for example, a financial institution, and the like. Backend 318 also may be associated with one or more servers that enable the various services provided by system 300.

Referring back to FIG. 1, communication module 118 may enable communication between the components of system 100. Communication module 118 may include hardware, software, and firmware that may enable communication between financial institution 102 and other components of system 100 using network 106, for example. Communication module 118 also may transmit messages to a mobile device (e.g., mobile device 104 or client device 302) in response to a trigger. For example, communication module 118 may transmit an advertisement, offer, or other trigger response via, for example, text message, email, push notification, web page, contextual information (e.g., information about a customer earning a reward and the like), and the like when the user of a mobile device makes a payment and the financial institution receives an authorization request thus causing a trigger event.

Consumer database 122 may include additional data elements that may be used in the trigger module 120 in order to determine which functionality trigger to send to a mobile device 104. Consumer database 122 may include data such as consumer preferences including, but not limited to, consumer purchase history, consumer online browsing history, consumer purchase method, or the like.

Trigger module 120 may include business logic and used to determine which functionality trigger to send to a mobile device 104. For example, trigger module 120 may include executable programs that determine, based on a purchase whether to trigger account functionality, rewards functionality, offer/advertisement/trivia functionality, and/or social networking functionality. Once a functionality trigger has been determined, the functionality trigger may be sent to the consumer's mobile device 104. In various example embodiments, trigger module 120 may be associated with an authorization network to receive data from an authorization network about use of a payment card.

Where a financial institution is not the account holder and a separate account provider 110 holds the account, the account provider 110 may notify the financial institution of account activity, such as an authorization request, and the financial institution may use the notification in a trigger module 120 in order to produce a functionality trigger to transmit to a consumer's mobile device 104

Merchant 108 may include a Point of Sale (PoS) device 112 and a payment processing system 114. In various embodiments, PoS 112 may be any device that may receive payment instructions from, for example, a magnetic strip payment card, a secure chip technology payment card, an NFC communication device, or any other form of payment. PoS device 112 may be for example, PoS devices made by VeriFone® and/or any other like devices. As illustrated in FIG. 1 by the dotted line connecting mobile device 104 to PoS device 112, mobile device 104 may be communicatively coupled with PoS device 112 using near field communication, or NFC. A PoS device 112 may also be any device capable of receiving and transmitting payment and transaction information from any payment method. By way of example, payment options may include mobile contactless payments, remote electronic payments, magnetic strip payments, secure chip technology payments, person-to-person payments, and the like. In an example embodiment, PoS device 112 may be capable of utilizing standardized transmission protocols, for example but not by way of limitation, ISO/IEC 14443 A/B, ISO/IEC 18092, MiFare, FeliCa, tag/smartcard emulation, and the like. Also, PoS device 112 may be able to utilize transmission protocols and methods that are developed in the future using other frequencies or modes of transmission. PoS device 112 may also be backwards-compatible with existing payment techniques, for example RFID. Also, the system may support transmission requirements to meet new and evolving payment standards including internet based transmission triggered by NFC.

Payment processing system 114 may allow merchant 108 to request and process payments, for example. Payment processing system 114 may utilize network 106 to communicate payment requests to financial institution 102 or account provider 110 and receive authorization requests. In communicated payment requests, payment processing system 114 may transmit information to financial institution 102 and/or account provider system 110 using, for example, networks maintained by Visa®, MasterCard®, Discover®, American Express® and the like.

Figure 4:
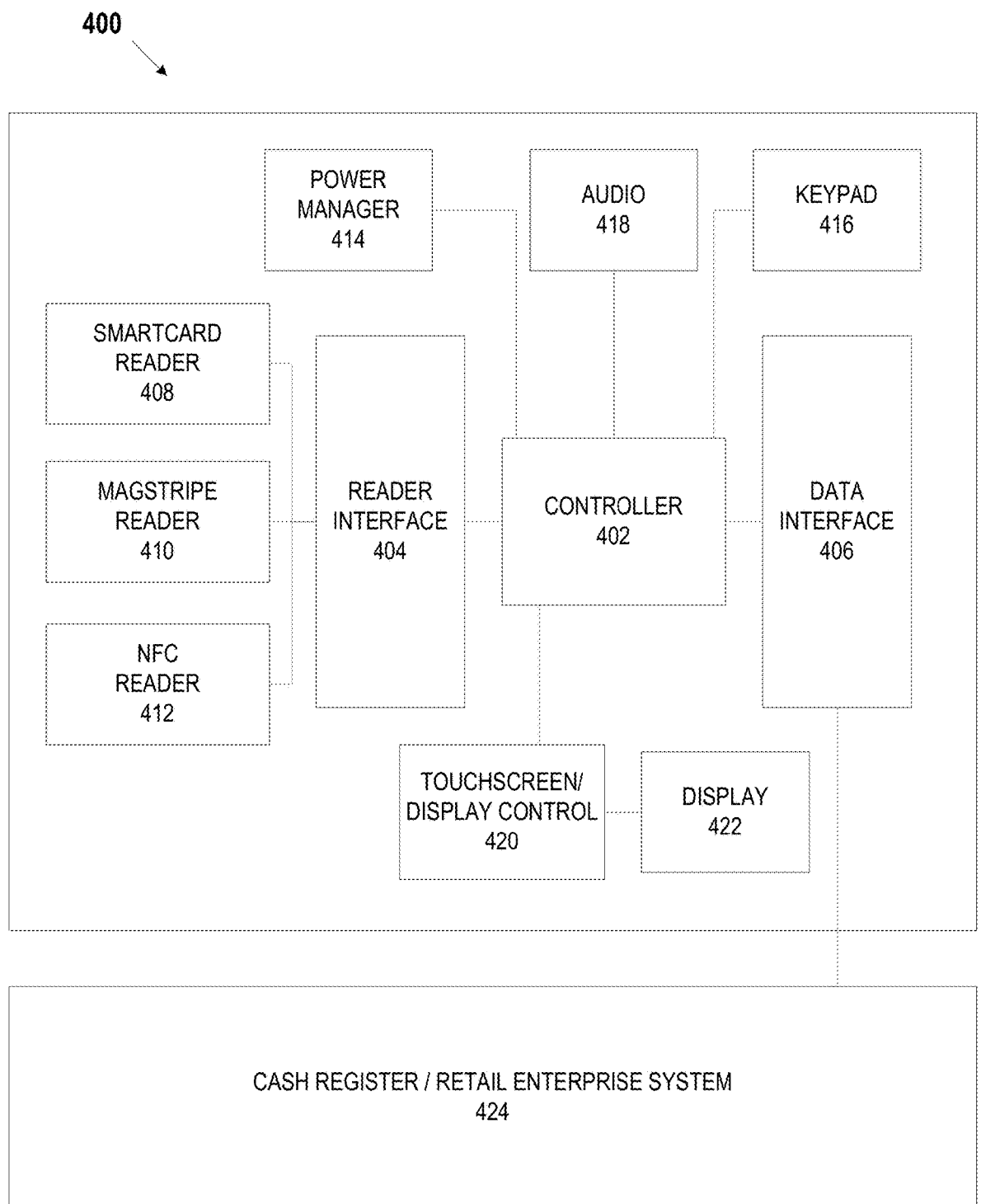
FIG. 4 depicts an example embodiment of a point of sale device according to the disclosure.

FIG. 4 depicts an example Point of Sale (PoS) device 400. PoS device 400 may provide the interface at what a customer or end user makes a payment to the merchant in exchange for goods or services. PoS device 400 may include and/or cooperate with weighing scales, scanners, electronic and manual cash registers, electronic funds transfer at point of sale (EFTPOS) terminals, touch screens and any other wide variety of hardware and software available for use with PoS device 400. PoS device 400 may be a retail point of sale system and may include a cash register and/or cash register-like computer components to enable purchase transactions. PoS device 400 also may be a hospitality point of sale system and include computerized systems incorporating registers, computers and peripheral equipment, usually on a computer network to be used in restaurant, hair salons, hotels or the like. PoS device 400 may be a wireless point of sale device similar to a PoS device described herein or, for example a tablet computer that is configured to operate as a PoS device, including for example, software to cause the tablet computer to execute point of sale functionality and a card reader such as for example the Capital One® SparkPay card reader, the Square® reader, Intuit's® GoPayment reader, or the like. PoS device 400 also may be a cloud-based point of sale system that can be deployed as software as a service, which can be accessed directly from the Internet using, for example, an Internet browser.

Referring to FIG. 4, an example PoS device 400 is shown. PoS device 400 may include a controller 402, a reader interface 404, a data interface 406, a smartcard reader 408, a magnetic stripe reader 410, a near-field communications (NFC) reader 412, a power manager 414, a keypad 416, an audio interface 418, a touchscreen/display controller 420, and a display 422. Also, PoS device 400 may be coupled with, integrated into or otherwise connected with a cash register/retail enterprise system 424.

In various embodiments, Controller 402 may be any controller or processor capable of controlling the operations of PoS device 400. For example, controller 402 may be a Intel® 2nd Generation Core™ i3 or i5 or Pentium™ G850 processor or the like. Controller 402 also may be a controller included in a personal computer, smartphone device, tablet PC or the like.

Reader interface 404 may provide an interface between the various reader devices associated with PoS device 400 and PoS device 400. For example, reader interface 404 may provide an interface between smartcard reader 408, magnetic stripe reader 410, NFC reader 412 and controller 402. In various embodiments, reader interface 404 may be a wired interface such as a USB, RS232 or RS485 interface and the like. Reader interface 404 also may be a wireless interface and implement technologies such as Bluetooth, the 802.11(x) wireless specifications and the like. Reader interface 404 may enable communication of information read by the various reader devices from the various reader devices to PoS device 400 to enable transactions. For example, reader interface 404 may enable communication of a credit or debit card number read by a reader device from that device to PoS device 400. In various embodiments, reader interface 404 may interface between PoS device 400 and other devices that do not necessarily "read" information but instead receive information from other devices.

Data interface 406 may allow PoS device 400 to pass communicate data throughout PoS device and with other devices including, for example, cash register/retail enterprise system 424. Data interface 406 may enable PoS device 400 to integrate with various customer resource management (CRM) and/or enterprise resource management (ERP) systems. Data interface 406 may include hardware, firmware and software that make aspects of data interface 406 a wired interface. Data interface 406 also may include hardware, firmware and software that make aspects of data interface 406 a wireless interface. In various embodiments, data interface 406 also enables communication between PoS device other devices.

Smartcard reader 408 may be any electronic data input device that reads data from a smart card. Smartcard reader 408 may be capable of supplying an integrated circuit on the smart card with electricity and communicating with the smart card via protocols, thereby enabling read and write functions. In various embodiments, smartcard reader 408 may enable reading from contact or contactless smart cards. Smartcard reader 408 also may communicate using standard protocols including ISO/IEC 7816, ISO/IEC 14443 and/or the like or proprietary protocols.

Magnetic stripe reader 410 may be any electronic data input device that reads data from a magnetic stripe on a credit or debit card, for example. In various embodiments, magnetic stripe reader 410 may include a magnetic reading head capable of reading information from a magnetic stripe. Magnetic stripe reader 410 may be capable of reading, for example, cardholder information from tracks 1, 2, and 3 on magnetic cards. In various embodiments, track 1 may be written on a card with code known as DEC SIXBIT plus odd parity and the information on track 1 may be contained in several formats (e.g., format A, which may be reserved for proprietary use of the card issuer; format B; format C-M which may be reserved for us by ANSI subcommittee X3B10; and format N-Z, which may be available for use by individual card issuers). In various embodiments, track 2 may be written with a 5-bit scheme (4 data bits plus 1 parity). Track 3 may be unused on the magnetic stripe. In various embodiments, track 3 transmission channels may be used for transmitting dynamic data packet information to further enable enhanced token-based payments.

NFC reader 412 may be any electronic data input device that reads data from a NFC device. In an exemplary embodiment, NFC reader 412 may enable Industry Standard NFC Payment Transmission. For example, the NFC reader 412 may communicate with a NFC enabled device to enable two loop antennas to form an air-core transformer when placed near one another by using magnetic induction. NFC reader 412 may operate at 13.56 MHz or any other acceptable frequency. Also, NFC reader 412 may enable a passive communication mode, where an initiator device provides a carrier field, permitting answers by the target device via modulation of existing fields. Additionally, NFC reader 412 also may enable an active communication mode by allowing alternate field generation by the initiator and target devices.

In various embodiments, NFC reader 412 may deactivate an RF field while awaiting data. NFC reader 412 may receive communications containing Miller-type coding with varying modulations, including 100% modulation. NFC reader 412 also may receive communications containing Manchester coding with varying modulations, including a modulation ratio of approximately 10%, for example. Additionally, NFC reader 412 may be capable of receiving and transmitting data at the same time, as well as checking for potential collisions when the transmitted signal and received signal frequencies differ.

NFC reader 412 may be capable of utilizing standardized transmission protocols, for example but not by way of limitation, ISO/IEC 14443 A/B, ISO/IEC 18092, MiFare, FeliCa, tag/smartcard emulation, and the like. Also, NFC reader 412 may be able to utilize transmission protocols and methods that are developed in the future using other frequencies or modes of transmission. NFC reader 412 also may be backwards-compatible with existing payment techniques, such as, for example RFID. Also, NFC reader 412 may support transmission requirements to meet new and evolving payment standards including internet based transmission triggered by NFC. In various embodiments, NFC reader 412 may utilize MasterCard's® PayPass and/or Visa's® PayWave and/or American Express'® ExpressPay systems to enable transactions.

Although not shown and described, other input devices and/or readers, such as for example, barcode readers and the like are contemplated.

Power manager 414 may be any microcontroller or integrated circuit that governs power functions of PoS device 400. Power manager 414 may include, for example, firmware, software, memory, a CPU, a CPU, input/output functions, timers to measure intervals of time, as well as analog to digital converters to measure the voltages of the main battery or power source of PoS device 400. In various embodiments, Power manager 414 remain active even when PoS device 400 is completely shut down, unused, and/or powered by the backup battery. Power manager 414 may be responsible for coordinating many functions, including, for example, monitoring power connections and battery charges, charging batteries when necessary, controlling power to other integrated circuits within PoS device 400 and/or other peripherals and/or readers, shutting down unnecessary system components when they are left idle, controlling sleep and power functions (on and off), managing the interface for built-in keypad and trackpads, and/or regulating a real-time clock (RTC).

Keypad 416 may any input device that includes a set of buttons arranged, for example, in a block or pad and may bear digits, symbols and/or alphabetical letters. Keypad 416 may be a hardware-based or mechanical-type keypad and/or implemented in software and displayed on, for example, a screen or touch screen to form a keypad. Keypad 416 may receive input from a user that pushed or otherwise activates one or more buttons on keypad 416 to provide input.

Audio interface 418 may be any device capable of providing audio signals from PoS device 400. For example, audio interface may be a speaker or speakers that may produce audio signals. In various embodiments, audio interface 418 may be integrated within PoS device 400. Audio interface 418 also may include components that are external to PoS device 400.

Touchscreen/display control 420 may be any device or controller that controls an electronic visual display. Touchscreen/display control 420 may allow a user to interact with PoS device 400 through simple or multi-touch gestures by touching a screen or display (e.g., display 422). Touchscreen/display control 420 may be configured to control any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, touchscreen/display control 420 may receive inputs from the touchscreen and process the received inputs. Touchscreen/display control 420 also may control the display on PoS device 400, thereby providing the graphical user interface on a display to a user of PoS device 400.

Display 422 may be any display suitable for a PoS device. For example, display 422 may be a TFT, LCD, LED or other display. Display 422 also may be a touchscreen display that for example allows a user to interact with PoS device 400 through simple or multi-touch gestures by touching a screen or display (e.g., display 422). Display 422 may include any number of touchscreens, including, for example, resistive touchscreens, surface acoustic wave touchscreens, capacitive touchscreens, surface capacitance touchscreens, projected capacitance touchscreens, mutual capacitance touchscreens, self-capacitance touchscreens, infrared grid touchscreens, infrared acrylic projection touchscreens, optical touchscreens, touchscreens based on dispersive signal technology, acoustic pulse recognition touchscreens, and the like. In various embodiments, 422 may receive inputs from control gestures provided by a user. Display 422 also may display images, thereby providing the graphical user interface to a user of PoS device 400.

Cash register/retail enterprise system 424 may me any device or devices that cooperate with PoS device 400 to process transactions. Cash register/retail enterprise system 424 may be coupled with other components of PoS device 400 via, for example, a data interface (e.g., data interface 406) as illustrated in FIG. 4. Cash register/retail enterprise system 424 also may be integrated into PoS device 400.

In various embodiments, cash register/retail enterprise system 424 may be a cash register. Example cash registers may include, for example, mechanical or electronic devices that calculate and record sales transactions. Cash registers also may include a cash drawer for storing cash and may be capable of printing receipts. Cash registers also may be connected to a network to enable payment transactions. Cash registers may include a numerical pad, QWERTY or custom keyboard, touch screen interface, or a combination of these input methods for a cashier to enter products and fees by hand and access information necessary to complete the sale.

In various embodiments, cash register/retail enterprise system 424 may comprise an retail enterprise system and/or a customer relationship management system. Retail enterprise system 424 may enable retain enterprises to manage operations and performance across a retail operation. Retail enterprise system 424 may be a stand-alone application in, for example, individual stores, or may be interconnected via a network. Retail enterprise system 424 may include various point of sale capabilities, including the ability to, for example, customize and resize transaction screens, work with a "touch screen" graphical user interface, enter line items, automatically look up price (sales, quantity discount, promotional, price levels), automatically compute tax, VAT, look up quantity and item attribute, display item picture, extended description, and sub-descriptions, establish default shipping services, select shipping carrier and calculate shipping charges by weight/value, support multi-tender transactions, including cash, check, credit card, and debit card, accept food stamps, place transactions on hold and recall, perform voids and returns at POS, access online credit card authorizations and capture electronic signatures, integrate debit and credit card processing, ensure optional credit card discounts with address verification, support mix-and-match pricing structure, discount entire sale or selected items at time of sale, add customer account, track customer information, including total sales, number of visits, and last visit date, issue store credit, receive payment(s) for individual invoices, process deposits on orders, search by customer's ship-to address, create and process layaway, back orders, work orders, and sales quotes, credit items sold to selected sales reps, view daily sales graph at the PoS, view and print journals from any register, preview, search, and print journals by register, batch, and/or receipt number, print X, Z, and ZZ reports, print receipts, invoices, and pick tickets with logos/graphics, print kit components on receipt, reprint receipts, enter employee hours with an integrated time clock function, and/or sell when the network/server is down with an offline PoS mode. Retail enterprise system 424 also may include inventory control and tracking capabilities, reporting tools, customer management capabilities, employee management tools, and may integrate with other accounting software.

In various embodiments cash register/retail enterprise system 424 may be a hospitality PoS. In such embodiments, retail enterprise system 424 may include hospitality PoS software (e.g, Aloha PoS Restaurant software from NCR®, Micros® RES and Symphony software and the like), hospitality management software, and other hardware and software to facilitate hospitality operations.

Figure 5:
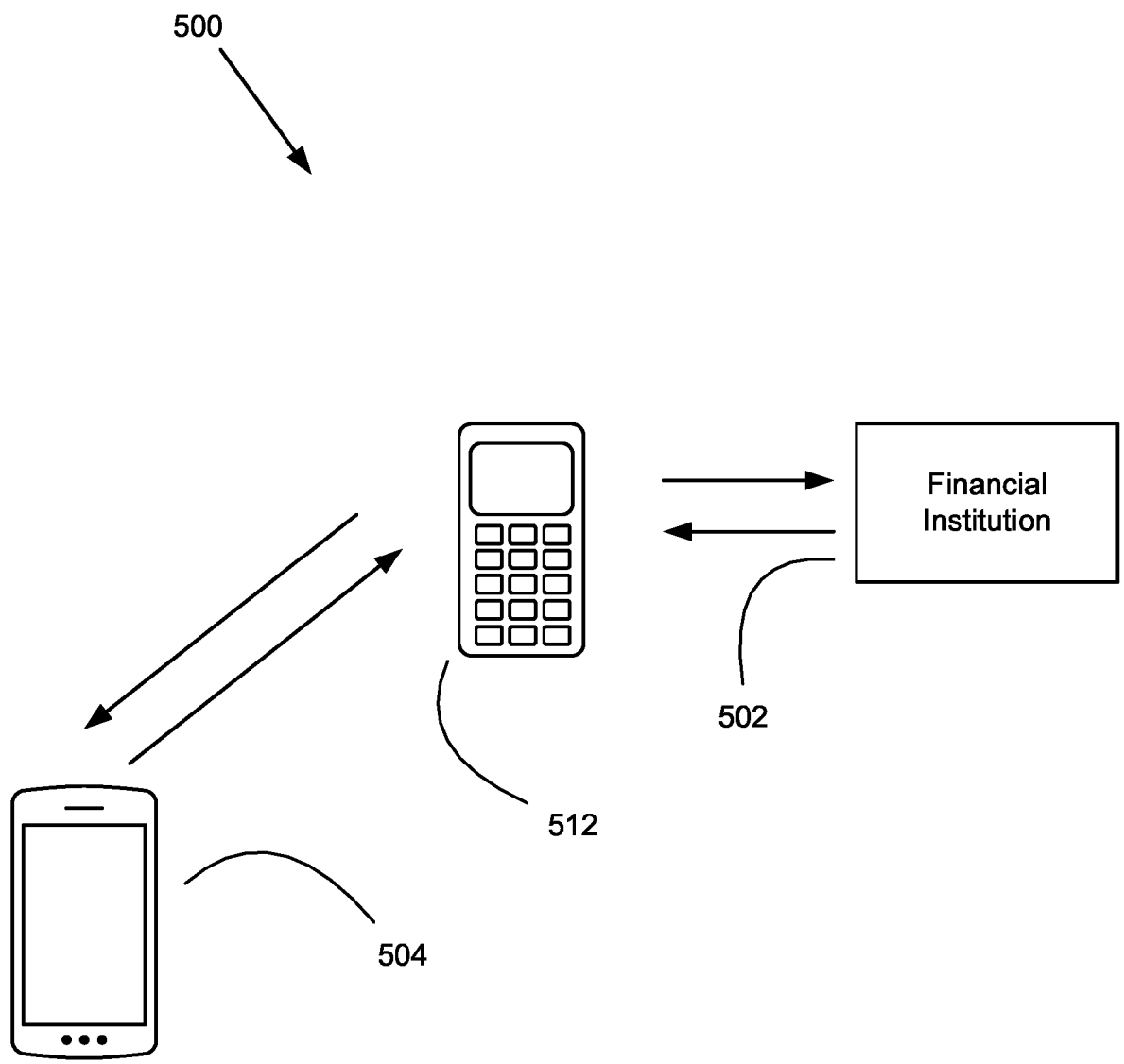
FIG. 5 depicts an example embodiment of a system implementing mobile device triggers using a payment card according to the disclosure.

FIG. 5 depicts an example system 500 for use with functionality triggering methods. As depicted in FIG. 5, system 500 may include a mobile device 504, a point-of-sale (PoS) terminal 512, and a financial institution 502. In various embodiments, mobile device 504 may be similar to mobile device 104 and/or client device 302 as described above. PoS terminal 512 may be similar to the PoS device as shown and described in FIG. 4. Financial institution 502 may be similar to financial institution 102 and/or the financial institution as shown and described in FIG. 3.

Mobile device 504 may be any mobile device capable of accessing the internet, and in the instance where the mobile device is used for mobile wallet capabilities, the mobile device 504 may be any mobile device capable of executing a payment. For example, mobile device 504 could be an iPhone, iPod, iPad from Apple® or any other mobile device running Apple's iOS operating system, any device running Google's Android® operating system, any device running Microsoft's Windows® Mobile operating system, any wearable mobile device such as, for example Google® Glass or the Samsung Galaxy® Gear Smartwatch, and/or any other smartphone or like device.

Mobile device 504 may include for example, a Subscriber Identity Module (SIM) card, an NFC module, and an App Processor. The SIM card may be an integrated circuit that securely stores the service-subscriber key (IMSI) used to identify a subscriber on mobile telephony devices (such as mobile phones and computers). The NFC module may be an embedded NFC chip that can send encrypted data a short distance ("near field") to a reader located, for instance, next to a retail cash register. The App Processor may enable execution of software applications on mobile device 504. In various embodiments, the App Processor may cooperate with the NFC module to enable a payment using mobile device 504. Additionally, mobile device 504 may include an attachment for contactless payments (not shown), such as a contactless payment attachment that plugs into an audio jack or plug of a mobile device.

The App Processor of the mobile device 504 may enable executing of a functionality that may be triggered by a trigger provided from a financial institution 502, which may include various user interfaces. The functionality trigger application and associated user interfaces may leverage transaction data, wireless data connection, over-the-air data connection, or other means of data transmission. The data used in the application may be transmitted from external data sources, such as an account provider (e.g., account provider 110) and/or a financial institution (e.g., financial institution 502, 102 and/or the financial institution system described in FIG. 3).

Mobile device 504 may also include various software components to facilitate a functionality triggering application For example, mobile device 504 may include an operating system such as, for example, the iOS operating system from Apple, the Google Android operating system, and the Windows Mobile operating system from Microsoft. Mobile device 104 may also include, without limitation, software applications such as mobile banking, mobile wallet, social networking, and other applications to facilitate a functionality triggering application, an NFC application programming interface, and software to enable touch sensitive displays. Mobile device manufacturers may provide software stacks or application programming interfaces (APIs) which allow software applications to be written on top of the software stacks. For example, mobile device manufacturers may provide, without limitation, a card emulation API to enable NFC card emulation mode, a logic link control protocol (LLCP) API for peer-to-peer communication between mobile devices, and a real-time data (RTD) API and a NFC Data Exchange Format (NDEF) API for reading/writing.

Figure 6:
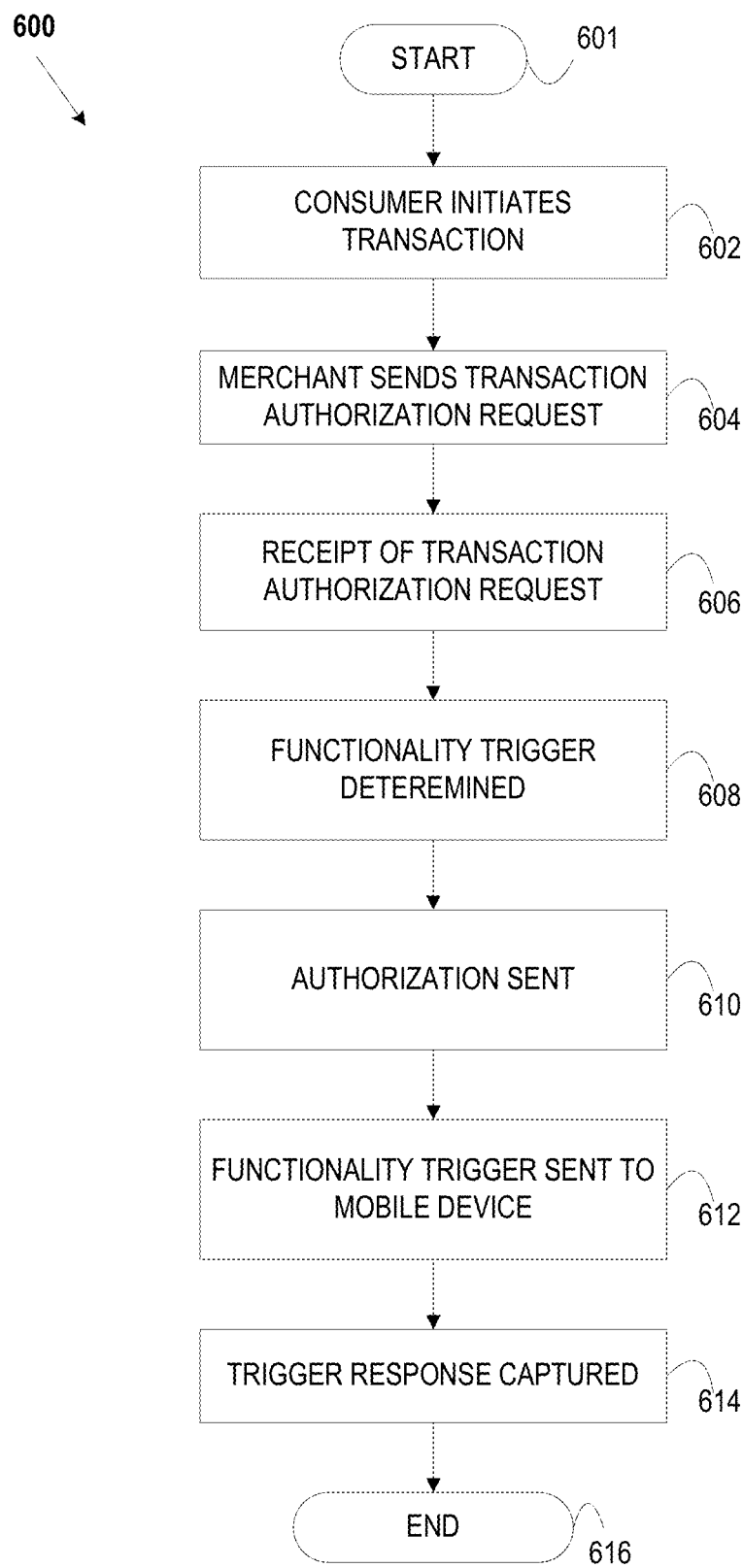
FIG. 6 depicts an example embodiment of a method for triggering mobile device functionality using a payment card according to the disclosure.

FIG. 6 provides an example method for providing a functionality trigger. Method 600, may begin in block 601.

In block 602, a consumer may initiate a transaction. Initiation of a transaction may occur when, for example, a consumer swipes a payment card with a magnetic strip, provides payment information over a telephone, submits payment information over the internet, utilizes "tap and pay" technology, uses a mobile wallet payment method (e.g., NFC payment), or any other form of payment. In various embodiments, the consumer may present a card for payment at a merchant (e.g., merchant 108). A consumer also may enter payment credential into a web page associated with an online merchant and submit the payment credentials for payment via the Internet. For example, as shown in FIG. 3, a consumer using a client device may submit payment credentials to a backend system associated with an online merchant, whereby the backend systems of the merchant are configured for an online merchant to sell products and/or services online and process payments for those products and/or services.

In block 604, the transaction may then be submitted to the account provider associated with the payment card in the form of an authorization request. The authorization request may be submitted in a manner as shown and described in FIG. 2. In block 606, a financial institution may receive notification of an authorization request. Where the financial institution is the account provider, the financial institution receives such notification upon receipt of a transaction authorization request. Where a financial institution is not the account provider but maintains a connection with the account provider, the account provider may provide notification that an authorization request has been received.

In block 608, once a transaction authorization request or notification has been received, a financial institution may determine, using a trigger module 120, which functionality to trigger on a consumer's mobile device. Also, in various embodiments, a third-party may maintain a trigger module 120. By way of example, the third party may receive a notification of a transaction and effect a communication on a consumer's mobile device in response to the transaction notification (e.g., a merchant application is maintained on the consumer's mobile device, a merchant maintains a record of the consumer's mobile device number or other identification means, or a third party application is maintained on the consumer's mobile device).

In block 610, the authorization for payment may be transmitted to a merchant to authorize a transaction in a manner similar to as shown and described above in FIG. 2. Following authorization, in block 612, a functionality trigger may be sent to the consumer's mobile device in order to trigger certain functionality on the consumer's mobile device.

In block 614, a response to the functionality triggered may be captured at the consumer's mobile device. The captured functionality may be sent back to the financial institution, to the account provider, or maintained in the consumer's mobile device.

In block 616, the authorization and functionality may end.

In the preceding specification, various preferred embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

The invention claimed is:

1. A system comprising:
an account database storing consumer account information;
a consumer database storing consumer purchase history data comprising previous transactions that were conducted with a first particular payment source, a second particular payment source, or both;
a processor associated with a financial institution system; and
memory storing instructions that, when executed by the processor, cause the system to:
receive, from a third-party system via a network, a first transaction authorization request associated with a first attempted purchase using the first particular payment source;
responsive to receiving the first transaction authorization request, determine that the first particular payment source is being used;
receive, from an account provider, a notification indicating that a second transaction authorization request associated with a second attempted purchase using a second particular payment source has occurred, determining that the second particular payment source is being used, wherein the account provider is separate and distinct from a financial institution associated with the financial institution system;
receive, from the third-party system, targeted information that is determined by the third-party system, wherein the targeted information is based on the first transaction authorization request, the consumer account information, and the consumer purchase history data;
identify a success rate based on a number of user responses received due to users mobile device interacting with mobile devices upon receiving prior push notifications per a number of the prior push notifications sent,
selecting a push notification comprising at least some of the targeted information based at least in part on the success rate;
transmit, to a mobile device associated with the first particular payment source, the desired push notification such that the mobile device is enabled to display, on a display of the mobile device, the at least some of the targeted information; and
receive, from the mobile device, a user response associated with the at least some of the targeted information, and
wherein transmitting the desired push notification to the mobile device occurs subsequent to transmitting, to the third-party system and via the network, a transaction authorization authorizing payment for the first attempted purchase,
wherein the desired push notification comprises a request to provide, via a social networking platform, a visible indication of approval for a product associated with the first attempted purchase, and
wherein the visible indication of approval comprises an indication of liking one or more of a product or a merchant, an indication of checking-in to a merchant location, and an indication of sharing information about the first attempted purchase.

2. The system of claim 1, wherein the first transaction authorization request is received via an authorization request.

3. The system of claim 1, wherein the targeted information comprises an advertisement.

4. The system of claim 1, wherein the targeted information is transmitted by contextual notification.

5. The system of claim 1, wherein the processor is configured to the targeted information via a social media platform.

6. The system of claim 1, wherein the desired push notification comprises at least one of:
(i) payment-related data including data indicative of a transaction receipt associated with the first attempted purchase, discounts applied, rewards earned, or some combination thereof;
(ii) account-related data including a post-transaction account balance, a rewards balance, an account summary, a breakdown of spending by category, or some combination thereof; or
some combination thereof.

7. The system of claim 1, wherein the desired push notification is selected at least in part based on preferences of the user.

8. A method comprising:
storing consumer account information in an account database;
storing consumer purchase history data in a consumer database;
receiving, via a network, a first transaction authorization request associated with a first attempted purchase using a first particular payment source;
responsive to receiving the first transaction authorization request, determining, by a processor associated with a financial institution system that is in communication with a mobile device associated with the first particular payment source and a second particular payment source, that the first particular payment source is being used, wherein the mobile device is capable of receiving and transmitting payment and transaction information from multiple payment sources;
receiving, from an account provider, a notification indicating that a second transaction authorization request associated with a second attempted purchase using the second particular payment source has occurred;
responsive to receiving the notification, determining that the second particular payment source is being used, wherein the account provider is separate and distinct from a financial institution associated with the financial institution system;
receiving, from a third-party system, targeted information, the targeted information being determined by the third-party system, wherein the target information is based on the first transaction authorization request or the second transaction authorization request, the consumer account information, and the consumer purchase history data;

identifying a success rate based on a number of user responses received due to a user associated with the mobile device interacting with the mobile device upon receiving prior push notifications per a number of the prior push notifications sent, selecting a push notification comprising at least some of the targeted information based at least in part on the success rate;

transmitting, by the processor and to the mobile device, the push notification such that the mobile device is enabled to display, on a display of the mobile device, the at least some of the targeted information; and receiving, by the processor and from the mobile device, a user response associated with the at least some of the targeted information; and wherein the push notification comprises a request to provide, via a social networking platform, a visible indication of approval for a product associated with the first attempted purchase or the second attempted purchase, and wherein the visible indication of approval comprises an indication of liking one or more of a product or a merchant, an indication of checking-in to a merchant location, and an indication of sharing information about the first attempted purchase or the second attempted purchase.

9. The method of claim 8, wherein push notification comprises account-related data functionality, and the account-related data functionality is associated with at least one of the first particular payment source and the second particular payment source.

10. The method of claim 9, wherein the account-related data functionality comprises at least one data type of the following data types related to the first particular payment source or the second particular payment source: account balance data, total account rewards data, account summary data, and breakdown of spending by category data.

11. The method of claim 10, wherein the targeted information is transmitted by contextual information.

12. The method of claim 10, wherein determining that the first particular payment source is being used is performed by the financial institution.

13. The method of claim 10, further comprising providing, to the mobile device, the targeted information via a social media platform.

14. The method of claim 10, wherein the push notification further comprises:
(i) payment-related data including data indicative of a transaction receipt associated with the first attempted purchase or the second attempted purchase, discounts applied, rewards earned, or some combination thereof;
(ii) account-related data including a post-transaction account balance, a rewards balance, an account summary, a breakdown of spending by category, or some combination thereof; or
payment-related data and account related data.

15. The method of claim 8, wherein the transmitting the push notification to the mobile device occurs subsequent to transmitting, to the third-party system and via the network, a transaction authorization authorizing payment for the first attempted purchase or the second attempted purchase.

16. A system comprising:
an account database storing consumer account information;
a consumer database storing consumer purchase history data comprising previous transactions that were conducted with the first particular payment source, the second particular payment source, or both;
a processor associated with a financial institution system; and
memory storing instructions that, when executed by the processor, cause the system to:
receiving, from a third-party system and via a network, a first transaction authorization request associated with a first attempted purchase transaction using a first particular payment source;
responsive to receiving the first transaction authorization request, determine that the first particular payment source is being used, wherein the first transaction authorization request indicates that: a user associated with a mobile device is attempting to complete a transaction, a corresponding electronic request associated with the first transaction authorization request is being sent in order to either approve or decline the transaction, and a clearing and settlement process will be initiated in response to the corresponding electronic request, the mobile device being associated with the first particular payment source;
receive, from the third-party system, a targeted advertisement that is determined by the third-party system, wherein the targeted advertisement is based on the first transaction authorization request, the consumer account information, and the consumer purchase history data;
identify a success rate based on a number of user responses received due to a user associated with the mobile device interacting with the mobile device upon receiving prior push notifications per a number of the prior push notifications sent;
select a push notification comprising at least some of the targeted advertisement based at least in part on the success rate; and
transmit, to the mobile device, the push notification such that the mobile device is enabled to display, on a display of the mobile device, the at least some of the targeted advertisement,
wherein the push notification further comprises a request to provide, via a social networking platform, a visible indication of approval for a product associated with the first attempted purchase transaction, and
wherein the visible indication of approval comprises an indication of liking one or more of a product or a merchant, an indication of checking-in to a merchant location, and an indication of sharing information about the first attempted purchase transaction.

17. The system of claim 16, wherein transmitting the push notification to the mobile device occurs subsequent to transmitting, to the third-party system and via the network, a transaction authorization authorizing payment for the first attempted purchase transaction.

* * * * *